March 2, 1954  L. MORAVEC ET AL  2,670,783
BAGMAKING MACHINE

Filed Nov. 7, 1952  3 Sheets-Sheet 1

INVENTOR
LADISLAV MORAVEC
ALFRED GANS
BY
Curtis, Morris & Safford
ATTORNEYS

March 2, 1954 L. MORAVEC ET AL 2,670,783
BAGMAKING MACHINE
Filed Nov. 7, 1952 3 Sheets-Sheet 3

INVENTOR
LADISLAV MORAVEC
ALFRED GANS
BY
Curtis, Morris & Safford
ATTORNEYS

Patented Mar. 2, 1954

2,670,783

UNITED STATES PATENT OFFICE 2,670,783

BAGMAKING MACHINE

Ladislav Moravec and Alfred Gans, Elmhurst, N. Y., assignors to Roto Bag Machine Corporation, New York, N. Y.

Application November 7, 1952, Serial No. 319,372

11 Claims. (Cl. 154—42)

This invention relates to improvements in bag-making machines, and particularly to an improved machine for making bags from so-called "plastic" materials, such as polyethylene and cellophane, or from other flexible sheet material.

In the type of machine with which the present invention is concerned, a continuous flattened tube of flexible thermoplastic material is heat sealed along regularly spaced lateral lines to divide the tube into individual compartments. The compartments or sections thus formed then are separated by cutting the tube crosswise adjacent each lateral seal to provide containers that are open at one end and closed at the other by the lateral seals.

In the past, it has been common practice in machines of this type to bring the plastic material to a complete stop each time a lateral heat seal is to be made. This, of course, is a time consuming operation, making it difficult to attain high production rates. On the other hand, various attempts to make lateral seals in a continuously moving plastic tube have not been entirely successful. It is, accordingly, among the objects of the present invention to provide an improved apparatus for making lateral seals in a continuously moving strip of relatively resilient material with a high degree of precision, insuring strong, uniform bonds and with the dimensions and spacing of the seals held to very close tolerances.

In accordance with a preferred embodiment of the invention, the foregoing and other related objects are attained in a heat sealing apparatus wherein a moving tube of plastic material is recurrently pressed between a movable heated bar and a moving resilient surface, with the heated bar being firmly held to the moving surface at the point of first contact by clamping members which are mounted to move with the heated bar and clamp against the moving tube and backing surface. This arrangement not only insures against heater slippage and consequent distortion of the heat seal, but also prevents stretching or overlap of the moving plastic tube. At the end of each heat sealing pass, the heated bar and associated clamping members are returned smoothly to their original position in readiness for the next sealing pass. In accordance with a further feature of the invention, provision is made for supplying electric heating current to the heated bar without the use of sliding contacts and yet without interruption of the electric circuit at any point in the travel of the heated bar.

A more complete understanding of the invention can be had by reference to the following description of an illustrative embodiment thereof, when considered in connection with the accompanying drawings, in which.

Figure 1:
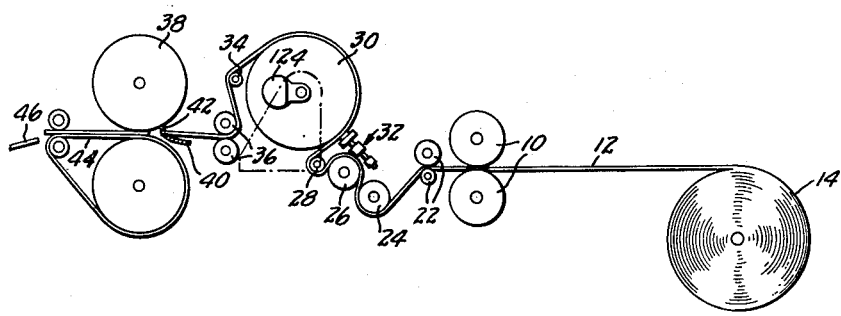
Figure 1 is a schematic diagram showing the movement of material through a bag-making machine embodying the invention.

As shown in Figure 1 of the drawings, a bag-making machine embodying the present invention may comprise drive rollers 10 feeding a flat tube 12 of plastic material through the machine at a substantially constant speed from a supply roll 14. It will be understood that the tube 12 may be pre-formed, by extrusion or the like, and supplied in flat form on the roll 14, or may be formed from a flat web of material, drawn from roll 14, by a suitable longitudinal folding and heat sealing mechanism well known in the art. In either case, the plastic material will be in flattened tube form as it passes the rollers 10.

The flat plastic tube 12 is fed from the drive rollers 10 through pressure rollers 22 to a pair of preheating rollers 24 and 26. Here the tube 12 is heated slightly in preparation for the lateral heat sealing operation with which the present invention is primarily concerned.

From the preheating rollers 24 and 26, the tube 12 passes over a small guide roller 28 and then partially around a relatively large cylinder 30, referred to hereinafter as the "sealing cylinder." During the course of its travel over the sealing cylinder 30, the tube 12 is sealed laterally at regularly spaced intervals by a heat sealing mechanism 32. Thus, as the tube 12 leaves the cylinder 30, it will be divided or compartmented by the lateral seal lines into uniform rectangular sections.

The compartmented tube 12 leaving the cylinder 30 then passes over a stripping roller 34 and through drive rollers 36 to a rotary cutter 38. Here the tube is sheared between a fixed blade 40 and a rotating blade 42 into sections of equal length, corresponding to the spacing between the lateral seals applied at the sealing cylinder. Each separated section thus forms an individual bag which is sealed across the bottom by the lateral seal. The bags thus formed are delivered by a short conveyor belt 44 to a stacking tray 46.

From the foregoing brief description of the machine, it can be understood that the operation performed at the heat sealing cylinder 30 involves a number of problems. The sealing mechanism 32 must be arranged to seal the moving tube 12 at precisely spaced intervals. Otherwise, the bags delivered to the stacking tray may be sealed at varying positions intermediate the ends, or they may be delivered irregularly as sections sealed at both ends mixed with sections open at both ends.

At the same time, it should be kept in mind that the sealing operation, unlike the cutting operation, for example, cannot be an instantaneous or "quick-contact" step. Rather, the tube walls must be held together and heated for an appreciable interval so that the plastic material can soften and flow together to form a uniform, permanent bond.

Again, it is essential that the heating mechanism engage the moving tube firmly, without slippage. Otherwise, the lateral seals will be of uneven width, or may even fail to form due to insufficient heating along any given line. Furthermore, the moving tube must not be pulled or stressed in any way while being sealed, as it can easily be deformed in its partially heated condition.

Figure 2:
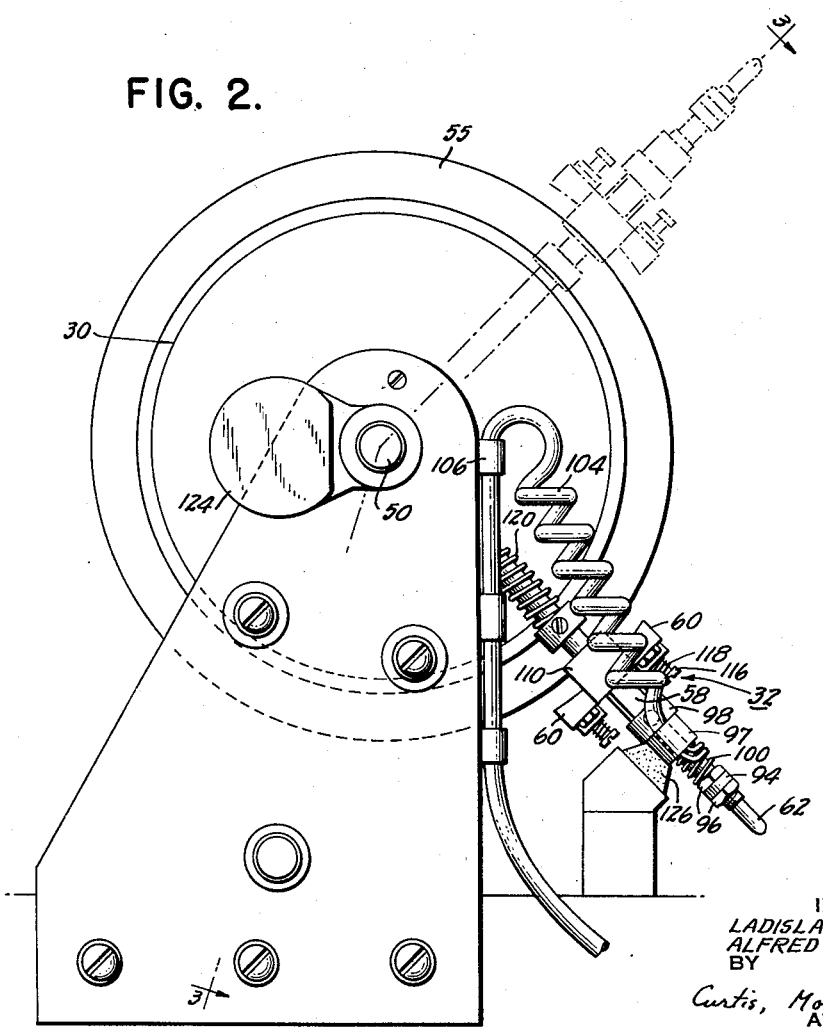
Figure 2 is an enlarged side elevation of the heat sealing mechanism in the machine of Figure 1.

As shown diagrammatically in Figure 2, the heat sealing mechanism 32 in the machine of Figure 1 is mounted for rotation about the axis of the sealing cylinder 30 so that the mechanism 32 is movable from a rest position (shown in full lines in Figure 2), approximately 45 degrees off the vertical and below the cylinder axis, to a second higher position (shown in dotted lines in Figure 2) approximately 120 degrees counter-clockwise around the cylinder periphery from the rest position. As explained more fully hereinafter, this rotational movement is obtained by moving the mechanism 32 radially into engagement with the moving cylinder, thereby causing the mechanism to "ride up" on the cylinder surface. During this upward travel, the plastic tube is clamped between the cylinder surface and a heated bar 58 to form the desired lateral heat seal. While the seal is forming, clamping members 60 firmly engage the cylinder surface on each side of the heated bar 58 to insure proper formation of the seal. Upon reaching its uppermost position in the rotational travel, the mechanism 32 is released from engagement with the cylinder surface and falls back by gravitational force to its original rest position.

Figure 3:
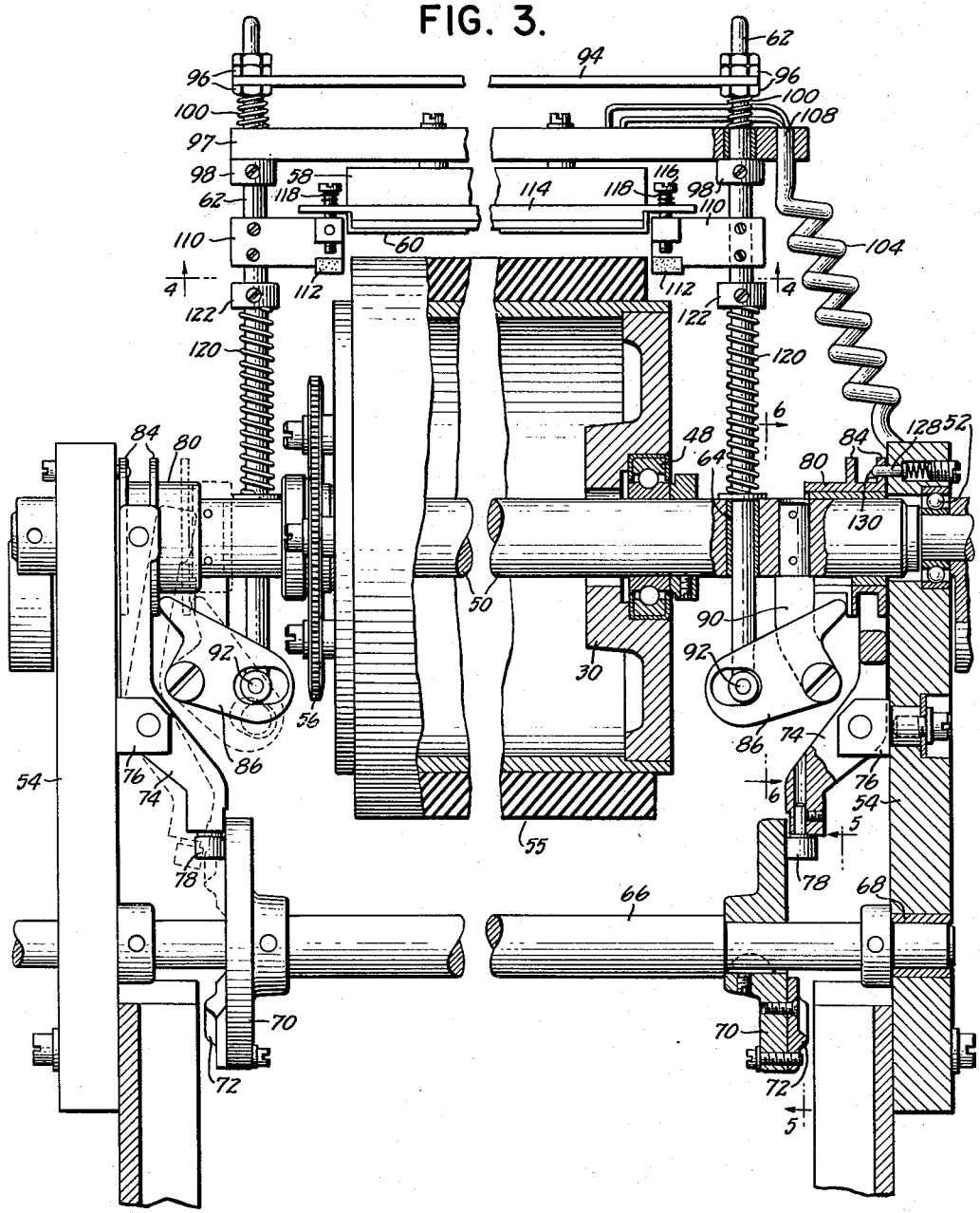
Figure 3 is a sectional view of the heat sealing mechanism of Figure 2, taken on the line 3—3 of Figure 2.

Considering, now, the details of the heat sealing apparatus, in Figure 3 the sealing cylinder 30 is shown mounted for rotation on bearings 48 on a shaft 50. The shaft 50 also is rotatably mounted in bearings 52 in a pair of upright support members 54. The cylinder 30 is covered by a pad 55 of the neoprene, silicone rubber, or similar resilient material, providing a resilient backing surface for the heat sealing operation. A driving sprocket 56 is secured to one end of the cylinder 30 to accommodate a drive chain (not shown) which is driven by the mechanism that operates the drive rollers and the cutter mechanism.

Figure 4:
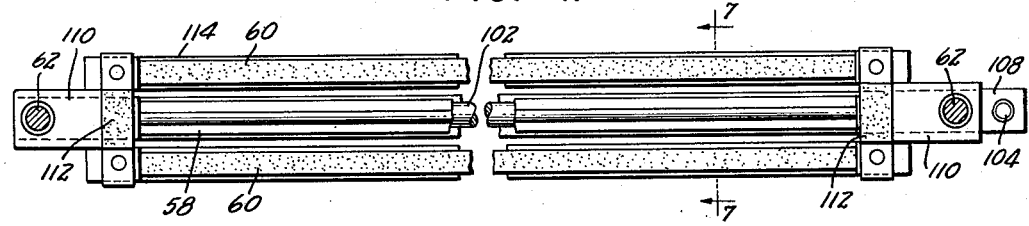
Figure 4 is a sectional view of the heated bar and the clamping members in the heat sealing mechanism, taken on the line 4—4 of Figure 3.

The heat sealing mechanism 32 includes a heated bar 58 mounted between a pair of clamping pads 60 (see Figure 4) on a pair of cam rods 62. The cam rods 62 are slidably mounted in holes 64 in the shaft 50, at opposite ends of the cylinder 30, so that the mechanism 32 can be moved radially with respect to the cylinder 30.

The rods 62 are arranged to be moved radially through the shaft 50 by a camming mechanism which includes a second shaft 66, mounted below the sealing cylinder shaft 50 in bearings 68 in the support members 54. The shaft 66 is arranged to be rotated in synchronism with the rotation of the shaft 50 by suitable drive means (not shown). Keyed to this second shaft 66 are a pair of cam wheels 70, each carrying a laterally protruding cam segment 72.

Figure 6:
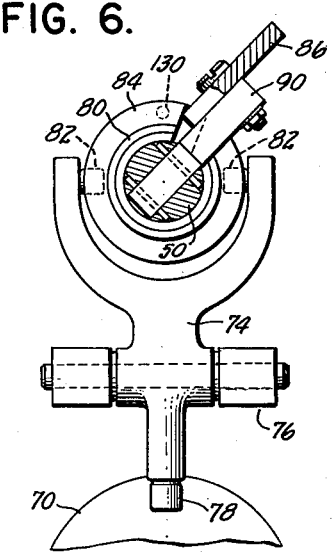
Figure 6 is a sectional view of the camming yoke in the same drive mechanism, taken on the line 6—6 of Figure 3.
Figure 7:
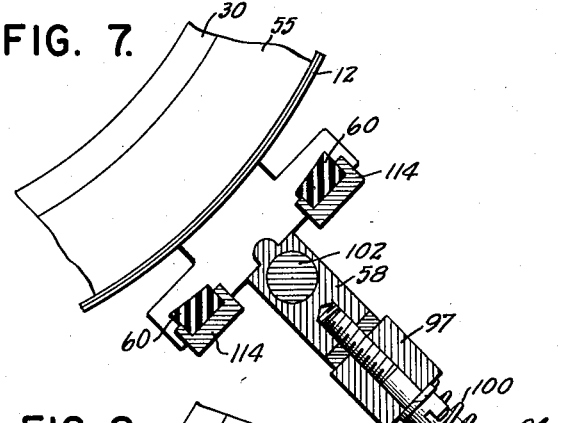
Figures 7-9 are enlarged fragmentary sectional views of the heat sealing mechanism in sequential operating positions, all taken on lines corresponding to the line 7—7 of Figure 4.
Figure 8:
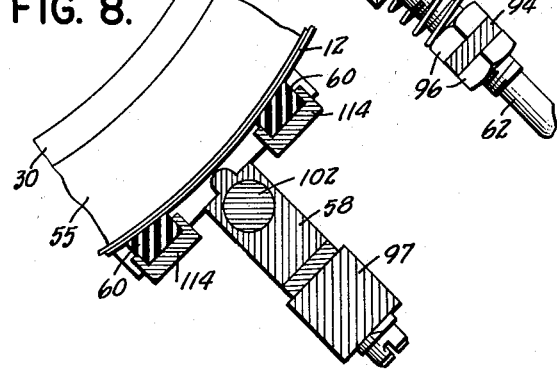
Figure 9:
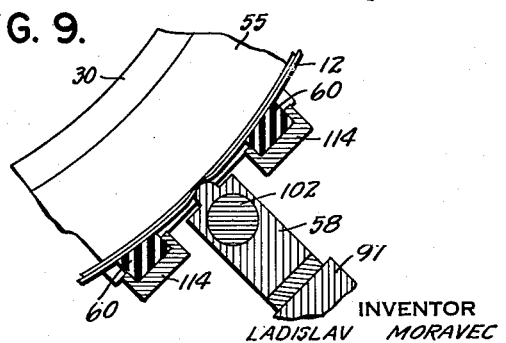
Figure 5:
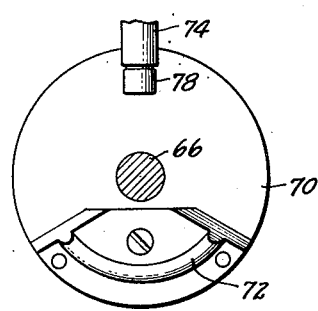
Figure 5 is a view, on the line 5—5 of Figure 3, of the cam wheel in the heat sealing drive mechanism.

Above the cam shaft 66, a pair of levers 74 are mounted to pivot laterally on brackets 76 in response to the action of the cam segments 72 riding against cam follower rollers 78 on the lower ends of the levers 74. The upper ends of the levers 74 are yoke-shaped (see Figure 6), and extend partially around collars 80 that are slidably mounted on the sealing cylinder shaft 50. From the fingers of the yokes, rollers 82 extend inwardly into annular grooves formed by flanges 84 on the surfaces of the slidable collars 80.

A pair of bell-crank levers 86 are pivotally mounted in support brackets 90 (Figure 6) fixed to the shaft 50 immediately adjacent the slidable collars 80. The bell cranks 86 are connected at one end by links 92 (Figure 3) to the cam rods 62, and at the other end ride against the innermost surface collar flanges 84.

It will now be evident that upon rotation of the cam shaft 66, the cam segments 72 will ride over the cam follower rollers 78, pivoting the levers 74 and causing the collars 80 to slide inwardly toward the respective ends of the sealing cylinder 30. A portion of the underside of each collar 80 is cut away adjacent the bell crank supports 90 so that the collars can move in the manner just stated. Actually, the collars 80 extend partially around the supports 90 in all positions of the collars, so that the collars are free to slide but not to rotate on the shaft 50. The purpose of this arrangement is explained hereinafter.

As the collars 80 slide inwardly, they will force the bell cranks 86 to pivot, moving the cam rods 62 radially in a direction to draw the mechanism 32 toward the sealing cylinder surface.

As was previously noted, it is extremely important that the heated bar 58 be held securely at its original point of contact with the cylinder surface. The arrangement of the clamping members which accomplish this holding action, together with the details of the heated bar mounting, will now be described.

The parts carried by the cam rods 62 include a spacer bar 94, held near the outermost ends of the rods 62 between nuts 96. Inwardly from the spacer bar 94 toward the cylinder 30, the heated bar 58 is suspended from a support member 97 that is slidable on the rods 62 between fixed stops 98 and the spacer bar nuts 96. The heater support 97 normally is held against the stops 98 by springs 100.

The bar 58 preferably is heated electrically, as by means of a so-called "cartridge" type heater 102 (see Figures 4 and 7-9) fitting endwise in the bar 58. In order to carry heating current to the heater 102 continuously without insulation difficulties and other complications, the heater 102 is connected to receive a helically wound, resilient, multi-conductor cable 104 that extends from a clamp 106 on one of the supports 54 (see Figure 2), at a point near the sealing cylinder shaft 50, to a hole 108 in one end of the heated bar support member 97. It is found that a helically wound cable of this type will withstand the rotational and reciprocating motion of the heated bar practically indefinitely without breaking.

A pair of support blocks 110 (Figure 3) are fixed to the rods 62 adjacent the stops 98. The blocks 110 carry a pair of clamp pad holders 114 that extend along opposite sides of the heated bar 58 (Figure 6) and have channel-shaped central sections in which the clamp pads 60 are held. The clamp pad holders 114 are mounted for movement toward and away from the cylinder 30 on guide bolts 116, but are normally held against the blocks by springs 118.

To insure proper engagement of the pads 60 with the cylinder cover pad 55, the surfaces of the pads 60 that face the cylinder surface are slanted at a slight angle to each other so as to lie parallel to planes tangent to the cylinder surface at the points where the pads 60 engage the bag-forming material. This arrangement can be best seen in Figure 7, wherein it is also evident that when the heated bar 58 and clamp pads 60 are out of engagement with the cylinder surface, the clamp pads 60 are somewhat closer than the heated bar to the surface 55. Normally, the mechanism 32 is held away from the cylinder 30, in the position shown in Figure 7, by springs 120 (Figure 3) acting against stops 122 on the cam rods 62.

As the camming mechanism acts on the rods 62 to move the heat sealing assembly 32 toward the sealing cylinder surface, the first parts to contact the cylinder cover pad 55 and plastic tube 12 will be the clamp pads 60. As the rods 62 continue to move radially against the force of the springs 120, the clamp pad carriers 114 will move away from the support blocks 110 against the bias of their holding springs 118, allowing the rods 62 to continue their radial movement. At this point, the parts will be in the relative positions shown in Figure 8, and the mechanism 32 will be moving with the rotating cylinder 30.

Continued movement of the rods 62 in the same direction eventually will bring the heated bar 58 into contact with the plastic tube 12 and press it against the cover pad 55. As soon as the bar 58 makes contact, the support member 97 will begin to slide outwardly on the rods 62 against the force of the springs 100, thus insuring that the tube 12 will be pressed uniformly and with increasing force between the cover pad 55 and the heated bar 58, until the parts reach the final position shown in Figure 9.

Thus, it is seen that before the heated bar 58 makes contact, the entire cam rod assembly will be clamped firmly to the rotating cylinder, causing the mechanism 32 to ride upwardly uniformly with the moving cylinder, and also holding the plastic tube securely to prevent any distortion of the bag-forming material.

At the end of a predetermined travel of the mechanism 32 with the cylinder 30, as controlled by the arcuate length of the cam segments 72, the cam follower rollers 78 will ride off the cam segments, releasing the cam rods 62. The springs 120 then will force the mechanism 32 to move radially outwardly, releasing the heated bar and clamp pads from engagement with the cylinder surface. Thereupon, the mechanism 32 will drop back by gravitational force to its original rest position in readiness for the next heat sealing operation.

As the mechanism 32 drops back down to its starting position, it will tend to pick up speed to an extent that might well overstress the mechanism as it is brought to an abrupt stop at its rest position. To offset this tendency, as well as to assist in getting the mechanism 32 started moving upwardly, the weight of the mechanism 32 is partially offset by a pair of counterweights 124 fixed to the cylinder shaft 50 at opposite ends thereof (see Figures 1 and 2). In order that the counterweights 124 will exert their maximum effect when the mechanism 32 is in its lowermost or rest position, the weights are so fixed to the shaft 50 that a line through the shaft axis and the center of gravity of the weights 124 will make an angle of about 135 degrees with a line through the shaft axis and the center of gravity of the mechanism 32. Since the rods 62 make an angle of about 45 degrees with the vertical when the mechanism 32 is in its rest position, it can be seen that the counterweights 124 will have their maximum effect when the mechanism 32 is in its rest position, and will have practically no effect when the mechanism 32 is at the uppermost point in its rotational movement. Accordingly, the counterweights 124 will assist in starting the mechanism 32 upwardly, will not impede the beginning of the downward movement of the mechanism, and then will gradually counteract the weight of the mechanism 32 as it nears its rest position in swinging downwardly.

To bring the downwardly swinging mechanism 32 to a cushioned stop, a resilient bumper pad 126 (Figure 2) is positioned to contact the heated bar support 97 when the mechanism 32 reaches the rest position. At the same time, as shown in Figure 3, the sliding collar 80 on the shaft 50 will be caught and held against further rotation by a spring-loaded catch pin 128 which is mounted on the support member 54 to engage a hole 130 in the collar flange 84. Since the collar 80 partially engages the bell crank support 90 as previously explained, it is seen that the locking action of the pin 128 will prevent rebound of the heat sealing mechanism 32 when it strikes the bumper 126. When the next heat sealing operation begins, the collar 80 will be moved inwardly and released from the pin 128 before the assembly 32 begins to swing upwardly.

We claim:

1. In a machine for making plastic bags, means for moving a continuous web of plastic material through the machine at a substantially constant speed, a rotatably mounted cylinder having a resilient outer covering and positioned so that said material passes partially around said cylinder in contact with the surface thereof, a clamping and heat sealing mechanism mounted for rotation about the axis of said cylinder, means for recurrently moving said mechanism into and out of engagement with the surface of said cylinder so as to clamp successive portions of said plastic material between said mechanism and the surface of said cylinder when clamped thereto, said mechanism including clamp means adapted to engage said cylinder surface and a heated bar having an electrical heating element for heat sealing said plastic material when said material is clamped between said bar and said cylinder surface, said mechanism being arranged to return by gravitational force to its original position when released from engagement with said cylinder, a counterweight secured to said mechanism for rotation therewith and arranged to at least partially counterbalance the weight of said mechanism during rotation thereof, and means for cutting said plastic material adjacent each heat seal formed therein.

2. In a machine for making plastic bags, means for moving a continuous tube of plastic material through the machine at a substantially constant speed, a rotatably mounted cylinder having a resilient outer covering and positioned so that said material passes partially around said cylinder in contact with the surface thereof, a clamping and heat sealing mechanism mounted for rotation about the axis of said cylinder, means for recurrently moving said mechanism into and out of engagement with the surface of said cylinder so as to clamp successive portions of said plastic material between said mechanism and the surface of said cylinder and cause said mechanism to ride upwardly with said cylinder surface when clamped thereto, said mechanism including (1) clamp means adapted to engage said cylinder surface, and (2) a heated bar having an electrical heating element for heat sealing said plastic material when said bar is clamped against said material, said mechanism being arranged to return by gravitational force to its original position when released from engagement with said cylinder, a counterweight secured to said mechanism for rotation therewith and extending from the axis of said drum at an angle to said mechanism such as to at least partially counterbalance the weight of said mechanism during rotation thereof, and means for cutting said plastic material adjacent each heat seal formed therein.

3. In a machine for making plastic bags, means for moving plastic material from which bags are to be formed through the machine at a substantially constant speed, a rotatably mounted cylinder having a resilient outer covering and positioned so that said material passes partially around said cylinder in contact with the surface thereof, a clamping and heat sealing mechanism mounted for rotation about the axis of said cylinder, means for recurrently driving said mechanism radially toward and away from the surface of said cylinder so as to clamp successive portions of said plastic material between said mechanism and the surface of said cylinder and cause said mechanism to be lifted by and move with said cylinder when clamped thereto, said mechanism including a heated bar having an electrical heating element therein for heat sealing said plastic material when said bar is clamped against said material, and means independent of said bar for clamping said mechanism to said cylinder surface, said mechanism being arranged to return by gravitational force to its original position when released from engagement with said cylinder, a counterweight secured to said mechanism for rotation therewith and so positioned with respect to said mechanism that a line through the axis of said cylinder and the center of gravity of said counterweight makes an angle of substantially 135 degrees with a line through said axis and the center of gravity of said mechanism, and means for cutting said plastic material adjacent each heat seal formed therein.

4. In a machine for making plastic bags, means for moving a continuous web of plastic material through the machine without interruption, a rotatably mounted cylinder having a resilient outer covering and positioned so that said material passes partially around said cylinder in contact with the surface thereof, a clamping and heat sealing mechanism mounted for rotation about the axis of said cylinder, means for recurrently driving said mechanism radially with respect to said cylinder so as to clamp successive portions of said plastic material between said mechanism and the surface of said cylinder and cause said mechanism to ride upwardly on the surface of said cylinder when clamped thereto, said mechanism including a heated bar having an electrical heating element therein for heat sealing said plastic material when said bar is clamped against said material, and clamp means independent of said bar for holding said mechanism firmly at the point of first contact with the cylinder surface, said mechanism being arranged to return by gravitational force to its original position when released from engagement with said cylinder, brake means associated with said radial drive means and arranged to stop rotational movement of said mechanism upon the return of said mechanism to said original position until said mechanism is subsequently moved radially toward said cylinder surface, a counterweight secured to said mechanism for rotation therewith and arranged so as to at least partially counterbalance the weight of said mechanism during rotation thereof, and means for cutting said plastic material adjacent each heat seal formed therein.

5. In a machine for making plastic bags, drive means for moving plastic material from which bags are to be formed through the machine at a substantially constant speed, a shaft, a cylinder rotatably mounted on said shaft and having a resilient outer covering, said shaft being positioned so that said material passes partially around said cylinder in contact with the surface thereof, a clamping and heat sealing mechanism mounted on said shaft for rotation about the axis of said cylinder and movable radially toward and away from said cylinder surface, means for recurrently moving said mechanism into and out of engagement with said cylinder surface so as to clamp successive portions of said plastic material between said mechanism and said surface and cause said mechanism to ride upwardly on said cylinder surface when clamped thereto, said mechanism including a heated bar having an electrical heating element therein for heat sealing said plastic material when clamped against said material, said mechanism being arranged to return by gravitational force to its original position when released from engagement with said cylinder, a pair of counterweights secured to said shaft at opposite ends of said cylinder and extending from said shaft at an angle with respect to said mechanism such that said counterweights at least partially counterbalance the weight of said mechanism, and means for cutting said plastic material adjacent each heat seal formed therein.

6. In a machine for making plastic bags, means for moving plastic material from which bags are to be formed through the machine without interruption, a rotatably mounted cylinder having a resilient outer covering and positioned so that said material passes partially around said cylinder in contact with the surface thereof, a clamping and heat sealing mechanism mounted for rotation about the axis of said cylinder, means for recurrently driving said mechanism radially toward and away from the surface of said cylinder so as to clamp successive portions of said plastic material between said mechanism and the surface of said cylinder and cause said mechanism to be lifted by and move with said cylinder when clamped thereto, said mechanism including a heated bar having an electrical heating element therein for heat sealing said plastic material when said bar is clamped against said material, said mechanism further including a pair of clamping pads positioned on opposite sides of said heated bar with the surfaces of said pads that face said cylinder surface being arranged at an angle to each other, said mechanism being arranged to return by gravitational force to its original position when released from engagement with said cylinder, and means for cutting said plastic material adjacent each heat seal formed therein.

7. In a machine for making plastic bags, means for moving a continuous flat tube of plastic material through the machine at a substantially constant speed, a rotatably mounted cylinder having a resilient outer covering and positioned so that said material travels part way around the surface of said cylinder in contact therewith in moving through said machine, a clamping and heat sealing mechanism mounted for rotation about the axis of said cylinder, means for recurrently driving said mechanism radially into and out of engagement with the surface of said cylinder to cause said mechanism to move upwardly along the path followed by said cylinder surface when clamped thereto, said mechanism including a heated bar having an electrical heating element therein for heat sealing said plastic material when said bar is clamped against said material, said mechanism further including clamping pads arranged parallel to and on opposite sides of said heated bar with the surfaces of said pads that face said cylinder surface being slanted so as to be parallel to planes tangent to said cylinder surface, said mechanism being arranged to fall by gravitational force to its original position after it moves a predetermined distance in contact with the surface of said cylinder, and means for cutting said plastic material adjacent each heat seal formed therein.

8. In a machine for making plastic bags, means for moving plastic material from which bags are to be formed through the machine at a substantially constant speed, a rotatably mounted cylinder having a resilient outer covering and positioned so that said material travels part way around the surface of said cylinder in contact therewith in moving through said machine, a clamping and heat sealing mechanism mounted for rotation about the axis of said cylinder, means for recurrently moving said mechanism radially into and out of engagement with the surface of said cylinder to cause said mechanism to move upwardly on said cylinder surface when clamped thereto, said mechanism including a heated bar having an electrical heating element therein for heat sealing said plastic material when clamped against said material, said mechanism further including clamping pads independent of said heated bar for holding said mechanism firmly to said cylinder surface, a resilient, helical, multi-conductor cable extending from a stationary point on said machine in the vicinity of said cylinder axis to said heated bar, said mechanism being arranged to fall by gravitational force to its original position after it moves a predetermined distance in contact with the surface of said cylinder, and means for cutting said plastic material adjacent each heat seal formed therein.

9. In a machine for making plastic bags, means for moving plastic material from which bags are to be formed through the machine at a substantially constant speed, a shaft, a cylinder rotatably mounted on said shaft and having a resilient outer covering, said shaft being positioned so that said material travels part way around the surface of said cylinder in contact therewith in moving through said machine, a clamping and heat sealing mechanism mounted on said shaft for rotation about the axis of said cylinder, means for recurrently driving said mechanism radially into and out of engagement with the outer surface of said cylinder to cause said mechanism to ride upwardly on said cylinder surface when clamped thereto, said mechanism including a heated bar having an electrical heating element therein for heat sealing said plastic material when clamped against said material, said mechanism further including clamping pads arranged on opposite sides of said heated bar with the surfaces of said pads that face said cylinder surface being at an angle to each other, said mechanism being arranged to fall by gravitational force to its original position after it moves a predetermined distance in contact with the surface of said cylinder, a pair of counterweights secured to the end shaft at opposite ends of said cylinder and arranged to at least partially counterbalance the weight of said mechanism during rotation thereof, and means for cutting said plastic material adjacent each heat seal formed therein.

10. In a machine for making plastic bags, means for moving plastic material from which bags are to be formed through the machine at a substantially constant speed, a rotatably mounted cylinder having a resilient outer covering and positioned so that said material travels part way around the surface of said cylinder in contact therewith in moving through said machine, a clamping and heat sealing mechanism mounted for rotation about the axis of said cylinder, means for recurrently moving said mechanism radially into and out of engagement with the surface of said cylinder to cause said mechanism to move upwardly on said cylinder surface when clamped thereto, said mechanism including a heated bar having an electrical heating element therein for heat sealing said plastic material when clamped against said material, said mechanism further including clamping pads independent of said heated bar for holding said mechanism firmly to said cylinder surface, a resilient, helical, multi-conductor cable extending from a stationary point on said machine in the vicinity of said cylinder axis to said heated bar, said mechanism being arranged to fall by gravitational force to its original position after it moves a predetermined distance in contact with the surface of said cylinder, a counterweight secured to said mechanism for rotation therewith and arranged to at least partially counterbalance the weight of said mechanism during rotation thereof, and means for cutting said plastic material adjacent each heat seal formed therein.

11. In a machine for making plastic bags, means for moving a web of plastic material through the machine without interruption, a rotatably mounted cylinder having a resilient outer covering and positioned so that said material passes partly around said cylinder in moving through said machine, a clamping and heat sealing mechanism mounted for rotation about the axis of said cylinder, means for recurrently moving said mechanism radially into and out of engagement with the surface of said cylinder to cause said mechanism to ride upwardly on the surface of said cylinder when clamped thereto, said mechanism including a heated bar having an electrical heating element for heat sealing said plastic material when clamped against said material, said mechanism further including clamping pads arranged on opposite sides of said heated bar with the surfaces of said pads that face said cylinder surface being slanted so as to be parallel to planes tangent to the cylinder surface, a resilient, helical, multi-conductor cable extending from a stationary point on said machine in the vicinity of said cylinder axis to said heated bar, said mechanism being arranged to fall by gravitational force to its original position after it moves a predetermined distance in contact with the surface of said cylinder, a counterweight secured to said mechanism for rotation therewith and arranged to at least partially counterbalance the weight of said mechanism during rotation thereof, and means for cutting said plastic material adjacent each heat seal formed therein.

LADISLAV MORAVEC.
ALFRED GANS.

References Cited in the file of this patent

UNITED STATES PATENTS

| Number | Name | Date |
|---|---|---|
| 2,467,879 | Billeb | Apr. 19, 1949 |